(12) United States Patent
Tsuboi

(10) Patent No.: US 6,753,686 B2
(45) Date of Patent: Jun. 22, 2004

(54) METHOD AND APPARATUS FOR DETECTING FAILURE OF DIFFERENTIAL TRANSFORMER, AND METHOD AND APPARATUS FOR SIGNAL PROCESSING OF DIFFERENTIAL TRANSFORMER

(75) Inventor: Masashi Tsuboi, Kawasaki (JP)

(73) Assignee: Mitutoyo Corporation, Kawaski (JP)

( * ) Notice: Subject to any disclaimer, the term of this patent is extended or adjusted under 35 U.S.C. 154(b) by 1 day.

(21) Appl. No.: 10/150,077

(22) Filed: May 20, 2002

(65) Prior Publication Data

US 2002/0171435 A1 Nov. 21, 2002

(30) Foreign Application Priority Data

May 21, 2001 (JP) ........................................ 2001-151016
May 21, 2001 (JP) ........................................ 2001-151017

(51) Int. Cl.[7] ............................ G01R 31/06; G01B 7/14
(52) U.S. Cl. .................. 324/547; 324/207.18; 324/607
(58) Field of Search ............................ 324/547, 207.18, 324/522, 527, 537, 607, 726, 614, 616, 622; 340/870.36; 341/144, 147; 702/189

(56) References Cited

U.S. PATENT DOCUMENTS

| 3,617,886 A | | 11/1971 | Werme ......................... 324/90 |
| 4,857,919 A | * | 8/1989 | Braswell ................. 340/870.36 |
| 5,250,907 A | * | 10/1993 | Fukui .......................... 324/614 |
| 5,278,552 A | * | 1/1994 | Ito ........................... 340/870.21 |
| 5,477,473 A | * | 12/1995 | Mandl et al. ................ 702/189 |
| 5,777,468 A | | 7/1998 | Maher ................... 324/207.18 |
| 5,784,015 A | | 7/1998 | Frindle ....................... 341/118 |

FOREIGN PATENT DOCUMENTS

JP    A 2001-91607    4/2001

* cited by examiner

Primary Examiner—Anjan K. Deb
(74) Attorney, Agent, or Firm—Oliff & Berridge PLC

(57) ABSTRACT

An offset signal for failure detection, that cannot be removed if an input signal line is broken is applied from an offset application circuit with output impedance higher than impedance of a differential transformer to an output signal of the differential transformer. A drive signal applied to a differential transformer is generated in digital form and an offset correction and a gain correction to output of the differential transformer are made in digital form for making controls necessary.

13 Claims, 15 Drawing Sheets

OFFSET CORRECTION

GAIN CORRECTION

BEFORE
CORRECTION
(RELATED ART)

AFTER
CORRECTION
(INVENTION)

METHOD AND APPARATUS FOR DETECTING FAILURE OF DIFFERENTIAL TRANSFORMER, AND METHOD AND APPARATUS FOR SIGNAL PROCESSING OF DIFFERENTIAL TRANSFORMER

BACKGROUND OF THE INVENTION

1. Field of the Invention

The present invention relates to a method and apparatus for detecting failure of a differential transformer used with an electric micrometer, etc.

This invention also relates to a method and apparatus for signal processing of a differential transformer for obtaining a measurement signal from the differential transformer. Particularly, the present invention relates to a method and apparatus for signal processing of a differential transformer suitably when small displacement measuring instruments such as electric micrometers are incorporated inline for use.

2. Description of the Related Art

As a displacement gauge for measuring displacement of the object to be measured, an electric micrometer is used for inline multipoint measurement as illustrated in FIG. 11.

In FIG. 11, numeral 10 denotes an electric micrometer containing a differential transformer, numeral 12 denotes a measurement unit, numeral 12A denotes offset and gain adjustment controls. Further, numeral 14 denotes a unit case in a built-in manner, numeral 14A denotes a selector, numeral 14B denotes a check meter, and numeral 16 denotes a personal computer (PC).

As shown in detail in FIG. 12, in the electric micrometer 10, displacement of a spindle 22 forming a part of a probe 20 is transmitted to a core 26. Sensor coils 28 and 30 are placed symmetrically with respect to the mechanical center position of the core 26 (called neutral point) and connected in series so as to form a differential transformer. The electric micrometer 10 uses change in the impedance of the sensor coils 28 and 30 depending on the position of the core 26 to detect displacement of the spindle 22. That is, the electric micrometer 10 detects displacement of the spindle 22 based on change depending on the position of the core 26 in the difference between voltages E1 and E2 (E1–E2) as shown in FIG. 13 occurring across each of the sensor coils 28 and 30 when a voltage is applied to the sensor coils 28 and 30 from an external oscillator 32.

Specifically, as shown in FIG. 14, a drive signal shaped like a sine wave generated in the oscillator 32 is applied to the sensor coils 28 and 30 through a transformer 40, for example. An amplifier 46 amplifies output at the neutral point of the sensor coils 28 and 30 and output of a variable resistor (called control) 42 for zero adjustment (offset correction). Output of the amplifier 46 is input through a span adjustment (gain correction) control 48 and a capacitor 50 for offset removal to a synchronous rectifier 52, which then half-wave or full-wave rectifiers the input in synchronization with the drive signal output by the oscillator 32. Then, output of the synchronous rectifier 52 is smoothed through a filter 54 and the analog signal output through the filter 54 is converted into a digital signal by an analog-digital (A/D) converter 56. Then, the digital signal is displayed in digital form on a display 58 implemented as a liquid crystal display (LCD), for example. In FIG. 14, numeral 44 denotes a resistor. However, in the electric micrometer using such a differential transformer, the sensor signal becomes zero at the mechanical neutral point of the probe 20 (core 26) and thus it is difficult to discriminate between a failure caused by a broken wire, etc., and the normal signal from the neutral point; this is a problem.

Further, to conduct high-accuracy measurement, the frequency stability and oscillation stability of the oscillator 32 need to be high, the amplification stability of the amplifier 46 needs to be high, and offset needs to be low.

However, the parts accuracy of the coil and capacitor used with the oscillator 32 for generating the sine wave to drive the sensor coils 20 and 30 are insufficient. Further, it becomes necessary to adjust the oscillation frequency and amplitude with trimmer control at the assembling time and the calibration time, and the frequency and voltage easily change due to temperature change. On the other hand, high-accuracy parts are expensive and moreover involve a problem of being still hard to raise stability.

Offset correction to set the origin and adjust the zero point as shown in FIG. 15 is made with the control 42. Gain correction to adjust the measurement span using a master work, etc., as shown in FIG. 16 is made with the control 48. However, the two controls 42 and 48 affect each other and thus adjustments are hard to make. Since the controls are used, the effects of temperature change and secular change are easily received. Further, since the control attachment space is required, there is a problem of being hard to miniaturize, etc.

Particularly, to conduct multipoint measurements with the electric micrometers incorporated inline, it is substantially almost impossible to make manual offset correction and manual gain correction for each probe.

Further, in the synchronous detection system using the synchronous rectifier 52, to deal with the various types of probes and lengths of signal cables, a phase shift occurs in an output signal to the probe and an input signal from the probe. FIG. 17A shows phase change depending on the probe type and FIG. 17B shows phase change caused by the cable length difference. Therefore, due to the phase shift occurring in the output signal to the probe and the input signal from the probe, synchronous rectification cannot well be conducted and the waveform may get out of shape as shown in the upper stage of FIG. 17C.

When the A/D converter 56 converts an analog signal into a digital signal, unless a filter having a large time constant is inserted, it is hard to suppress display flicker as shown in FIGS. 18 and 19 and improvement in the response speed is inhibited. This can lead to a fatal problem to incorporate the electric micrometers inline for use for automatic control in addition to simple display.

SUMMARY OF THE INVENTION

The invention is intended for solving the above-described problems in the related art.

It is a first object of the invention to provide a method and apparatus for failure of a differential transformer which can discriminate between the break state in an input signal line or a drive signal line and the normal state in the differential transformer.

It is a second object of the invention to provide a method and apparatus for signal processing of a differential transformer which can be incorporated inline for use for automatic control like a linear encoder by reducing the effects of temperature change and secular change, eliminating the need for adjustment at the assembling time, and facilitating calibration.

It is a third object of the invention to provide a method and apparatus for signal processing of a differential transformer which can deal with various types of probes, cable extension, etc.

It is a fourth object of the invention to provide a method and apparatus for signal processing of a differential transformer which can improve the response speed and suppress display flicker, etc., even with a filter having a small time constant.

In order to achieve the first object of the invention, there is provided a method for detecting failure of a differential transformer comprising: applying an offset signal for failure detection, that cannot be removed if an input signal line of the differential transformer is broken, from an offset application circuit to an output signal of the differential transformer, the offset application circuit having an output impedance higher than an impedance of the differential transformer.

Further, in order to achieve the first object of the invention, there is provided an apparatus for detecting failure of a differential transformer comprising: an offset application circuit for applying an offset signal for failure detection, that cannot be removed if an input signal line of the differential transformer is broken, to an output signal of the differential transformer, the offset application circuit having an output impedance set higher than an impedance of the differential transformer; an offset removal circuit for removing an offset from the output signal to which the offset signal is applied; a rectification circuit for rectifying an output signal of the offset removal circuit; and a level determination circuit for detecting the input signal line or a drive signal line of the differential transformer being broken based on an output level of the rectification circuit.

Preferably, the above-mentioned failure detection apparatus of the differential transformer further comprises: a signal processing portion for outputting an alarm to the exterior and holding an immediately preceding measurement data of the differential transformer if the signal line or the drive signal line of the differential transformer being broken is detected.

In order to achieve the second object of the invention, there is provided with an apparatus for signal processing of a differential transformer for obtaining a measurement signal from the differential transformer, comprising: a drive signal generation section for generating a drive signal to be applied to the differential transformer; and a signal processing section for obtaining the measurement signal from an output signal from the differential transformer, wherein at least a part of the drive signal generation section and the signal processing section is digitalized.

In the above-mentioned signal processing apparatus of the differential transformer, it is preferable that the drive signal generation section includes an oscillator for generating a clock signal, and a memory for storing a waveform data called in synchronization with the clock signal of the crystal oscillator.

Further, in the above-mentioned signal processing apparatus of the differential transformer, it is preferable that the signal processing section includes an output correction portion for making an offset correction and a gain correction to the output signal of the differential transformer in digital form.

Preferably, the offset correction and the gain correction are made externally.

In order to achieve the third object of the invention, in the above-mentioned signal processing apparatus of the differential transformer, the signal processing section includes a phase adjustment portion for digitally compensating for a phase shift in the output signal of the differential transformer In order to achieve the fourth object of the invention, in the above-mentioned signal processing apparatus of the differential transformer, the signal processing section includes a digital filter for providing hysteresis to the output signal of the differential transformer.

Preferably, the signal processing apparatus of the differential transformer further comprises a data communication function between electric units.

DETAILED DESCRIPTION OF THE INVENTION

Referring now to the accompanying drawings, there are shown preferred embodiments of the invention.

Figure 1:
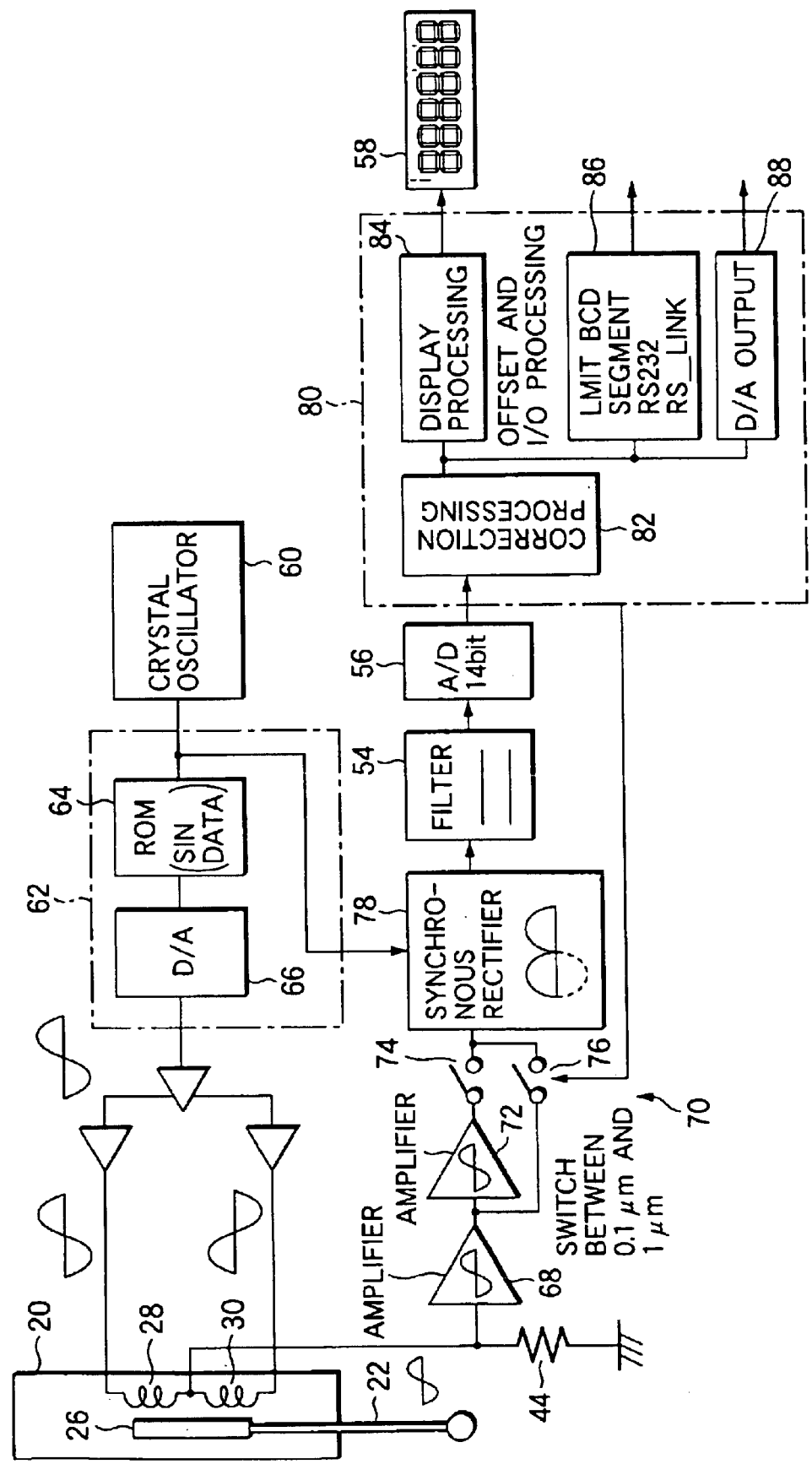
FIG. 1 is a circuit diagram to show the configuration of a first embodiment of an electric micrometer according to the invention.

As shown in FIG. 1, an electric micrometer of a first embodiment according to the invention comprises a crystal oscillator 60, a drive signal generation CPU 62, a high-accuracy resistor array 44, a stable gain amplifier 68, a range switch circuit 70, a synchronous rectifier 78, a filter 54, an A/D converter 56, and a signal processing CPU 80. The crystal oscillator 60 generates a clock signal and has extremely high frequency stability as compared with the oscillator 32 in the related art. The drive signal generation CPU 62 digitally generates a drive signal shaped like a sine wave according to the invention based on the clock signal output by the crystal oscillator 60. The drive signal generation CPU 62 includes a read-only memory (ROM) 64 and a digital-analog (D/A) converter 66. The ROM 64 stores sine wave (SIN) data. The D/A converter 66 converts output of the ROM 64 into an analog signal for output. The high-accuracy resistor array 44 and the stable gain amplifier 68 amplify a voltage occurring at the midpoint of sensor coils 28 and 30 similar to those in the related art. The range switch circuit 70 includes an amplifier 72 and switches 74 and 76 for switching the measurement range between 0.1 μm and 1 μm, for example. The synchronous rectifier 78 rectifies output of the range switch circuit 70 in synchronization with the clock signal output by the crystal oscillator 60. The filter 54 smoothes output of the synchronous rectifier 78. The A/D converter 56 is a 14-bit A/D converter, for example, and converts output of the filter 54 into a digital signal. The signal processing CPU 80 includes a correction processing section 82 for digitally making offset correction and gain correction according to the invention, a display processing section 84, an offset and input/output processing section 86, and a D/A output section 88.

Sine wave data is previously calculated and stored in the ROM 64 and the crystal oscillator 60 generates the read timing of the sine wave data in the ROM 64.

Offset correction and gain correction in the correction processing section 82 are made according to the following expression:

[Measurement value]={[reference value]/([span value]−[origin off-set value ])}*([counter value]−[origin offset value])   [Expression 1]

The {[reference value]/([span value]−[origin offset value])} is used for making gain correction. The ([counter value]−[origin offset value]) is used for making offset correction. The symbol "*" means the multiplication sign.

In the embodiment, the sine wave data stored in the ROM 64 contained in the drive signal generation CPU 62 rather than a coil and a capacitor as in the related art is used to generate a drive signal in synchronization with output of the crystal oscillator 60. Therefore, an extremely stable sine wave can be provided and trim adjustment, etc., is not required.

Offset correction and gain correction are also made by calculation as in Expression 1 in the correction processing section 82 contained in the signal processing CPU 80 rather than use of controls as in the related art. Therefore, unstable controls need not be used, adjustment is extremely easy to make, remote operation can be performed, and it is also easy to incorporate inline.

Further, the control attachment space is also unnecessary and miniaturization is possible.

Next, a second embodiment of an electric micrometer according to the invention will be discussed in detail with reference to FIG. 2.

Figure 2:
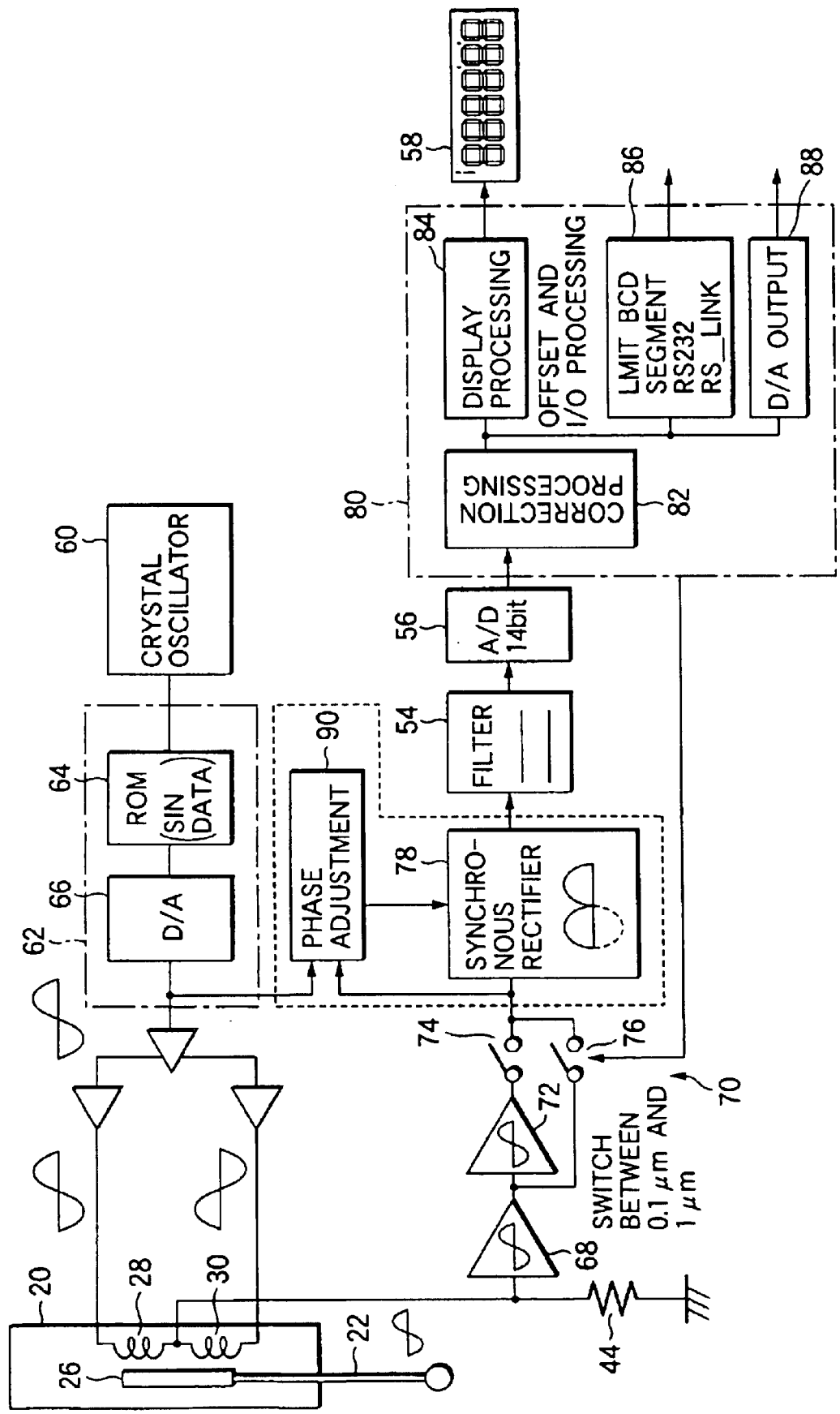
FIG. 2 is a circuit diagram to show the configuration of a second embodiment of an electric micrometer according to the invention.

In the electric micrometer of the second embodiment similar to that of the first embodiment, a synchronizing signal is input from a D/A converter 66 through a phase adjustment circuit 90 to a synchronous rectifier 78 as shown in FIG. 2 without giving a synchronizing signal directly to the synchronous rectifier 78 from a crystal oscillator 60.

Figure 3:
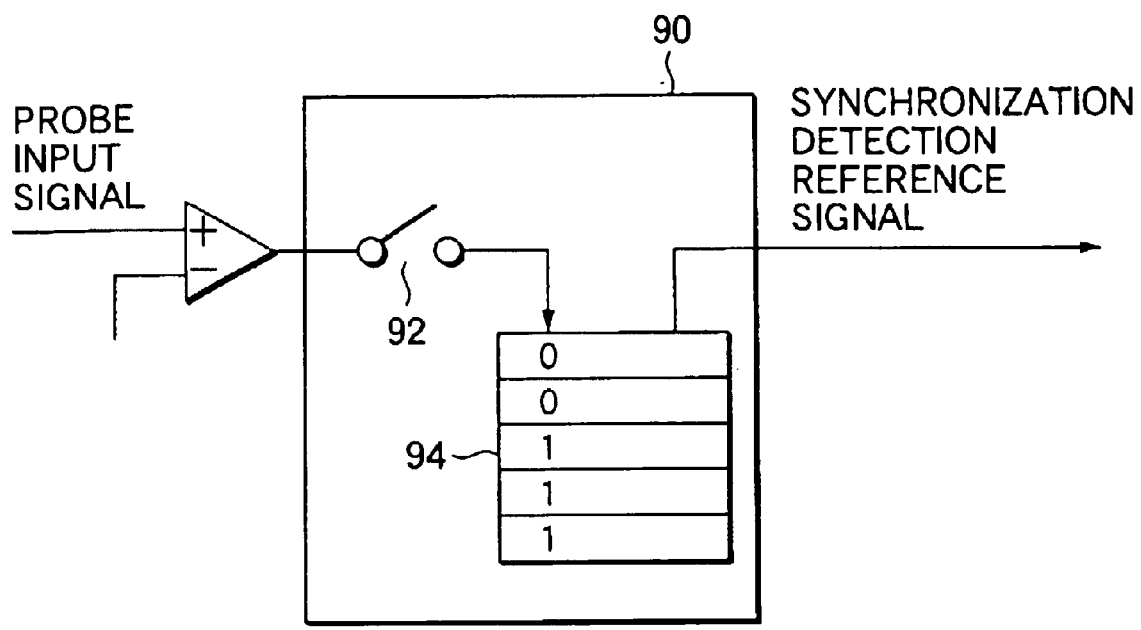
FIG. 3 is a circuit diagram to show the specific configuration of a phase adjustment circuit used in the second embodiment of the invention.

The phase adjustment circuit 90 comprises a calibration switch 92 and a memory 94 as shown in detail in FIG. 3. The calibration switch 92 is used for conducting calibration when output is large rather than in the vicinity of zero. The memory 94 is used for delaying an input signal by a predetermined amount stored in the memory, and is backed up with battery, for example.

When the input signal is sufficiently large, a reference signal for synchronization detection is output at the timing delayed by the timing stored in the backup memory 94. Therefore, if parasitic capacitance or impedance of a coil sensor changes due to the difference in the use environment, the cable length, the probe type, etc., it can easily dealt with by adjusting the delay amount by the phase adjustment circuit 90.

Other points are similar to those in the first embodiment and therefore will not be discussed again.

Figure 17A:
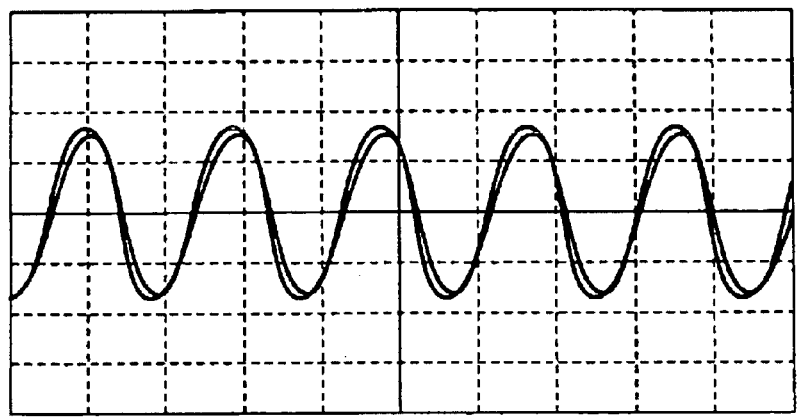
FIGS. 17A to 17C are graphs to show phase change examples when sensor types and cable lengths differ.
Figure 17B:
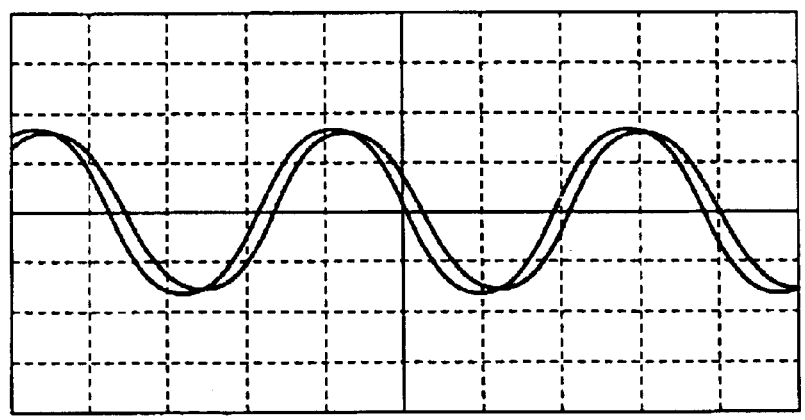
Figure 17C:
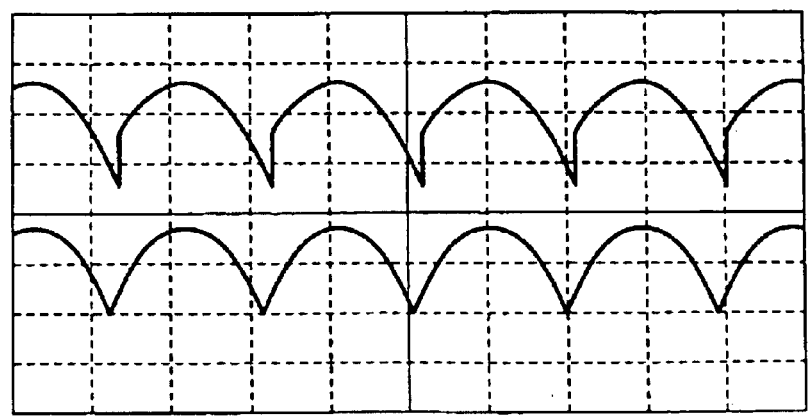
Figure 18:
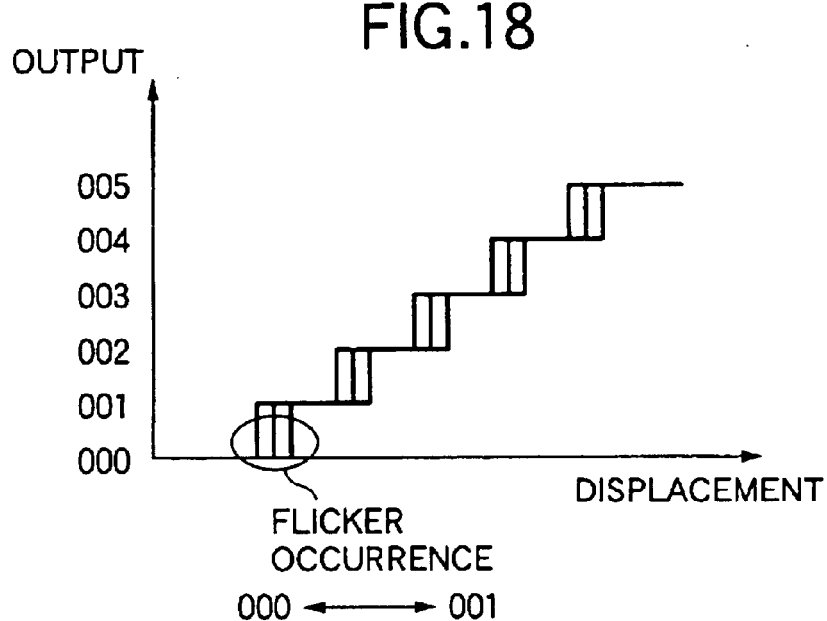
FIG. 18 is a drawing to show a state in which display flickers in related art example.

FIG. 17A shows phase change depending on the probe type and FIG. 17B shows phase change caused by the cable length difference. If such signals with a phase shift are synchronously rectified as they are, an unshaped rectification signal results as shown at the upper stage of FIG. 17C and accurate output cannot be provided. In contrast, according to the invention, by using the phase adjustment circuit 90, a good rectification signal as shown at the lower stage of FIG. 17C can be provided.

In the embodiment, the backup memory is used and thus if the power is turned off, the delay amount is stored. Whenever the power is turned off, adjustment can also be made so as to omit backup. When probe or cable replacement is conducted and the environment is changed, automatic setting can also be conducted. Further, if a phase shift can be detected by any other method, the calibration switch 92 can be omitted.

Next, a third embodiment of an electric micrometer according to the invention will be discussed in detail with reference to FIG. 4.

Figure 4:
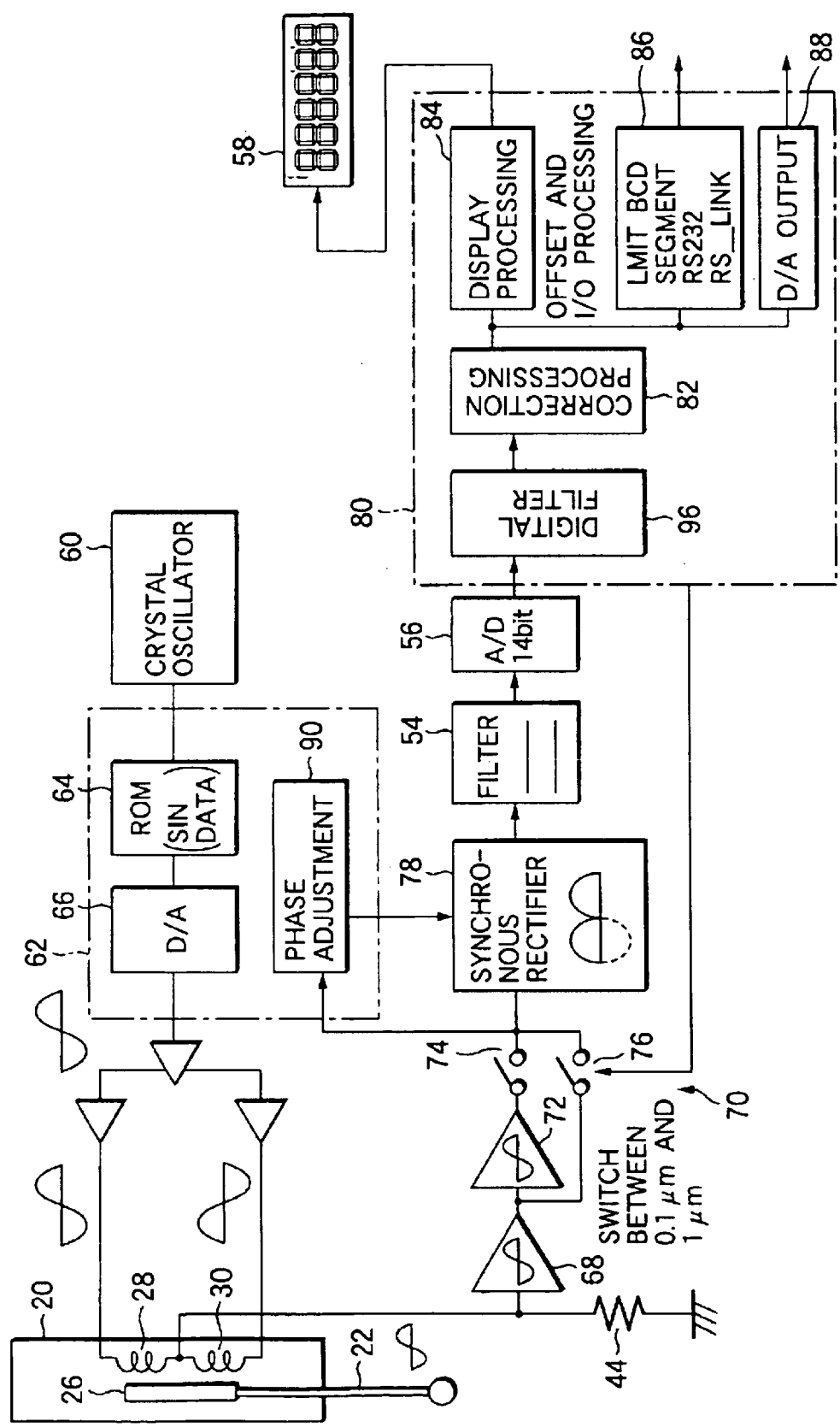
FIG. 4 is a circuit diagram to show the configuration of a third embodiment of an electric micrometer according to the invention.

The electric micrometer of the third embodiment further comprises a digital filter 96 provided in the signal processing CPU 80 in the second embodiment as shown in FIG. 4. The digital filter 96 can provide hysteresis to output of an A/D converter 56.

Figure 19:
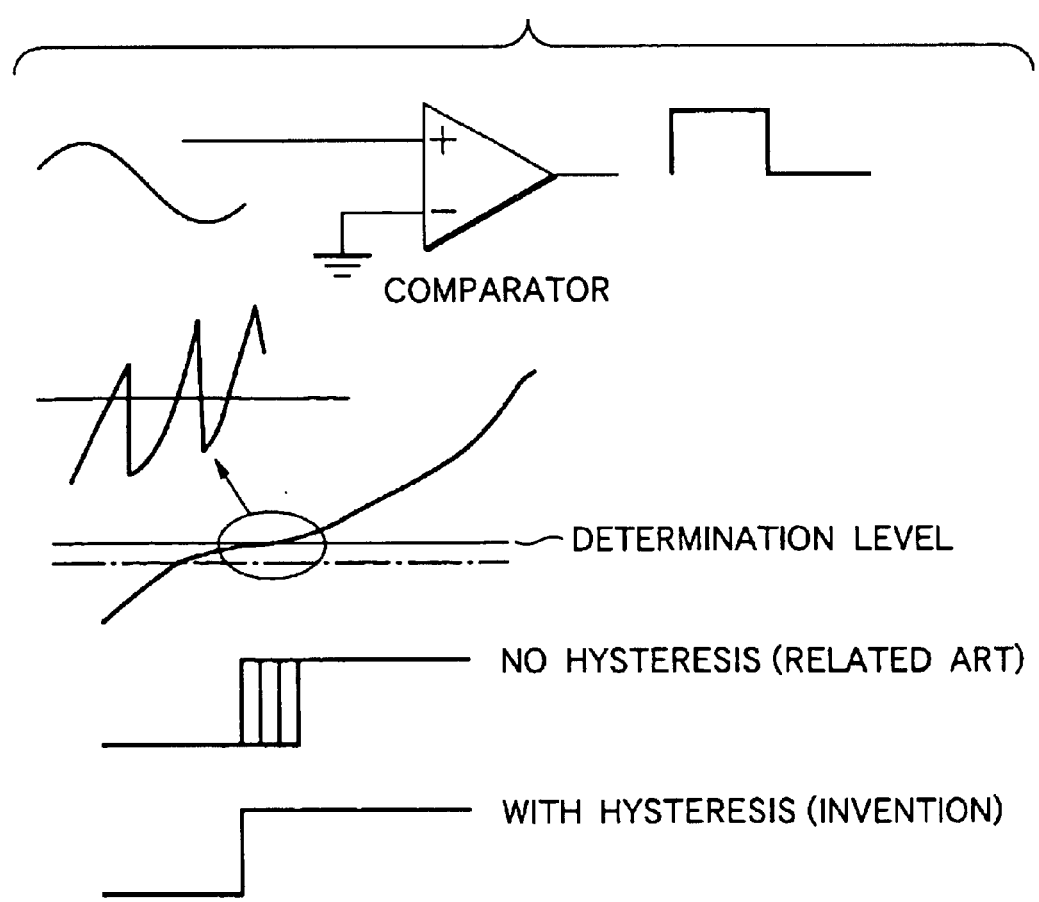
FIG. 19 is a drawing to show the concept of hysteresis.

That is, if the digital filter 96 is not added and hysteresis is not provided, display flickers due to signal fluctuation in the proximity of the determination level as shown in FIG. 19. In contrast, the digital filter of the invention provides hysteresis to output of the A/D converter 56 for making displacement display hard to change due to signal fluctuation in the proximity of the determination level. Therefore, stable display can be produced and approximately averaged measurement data can be provided.

Figure 5:
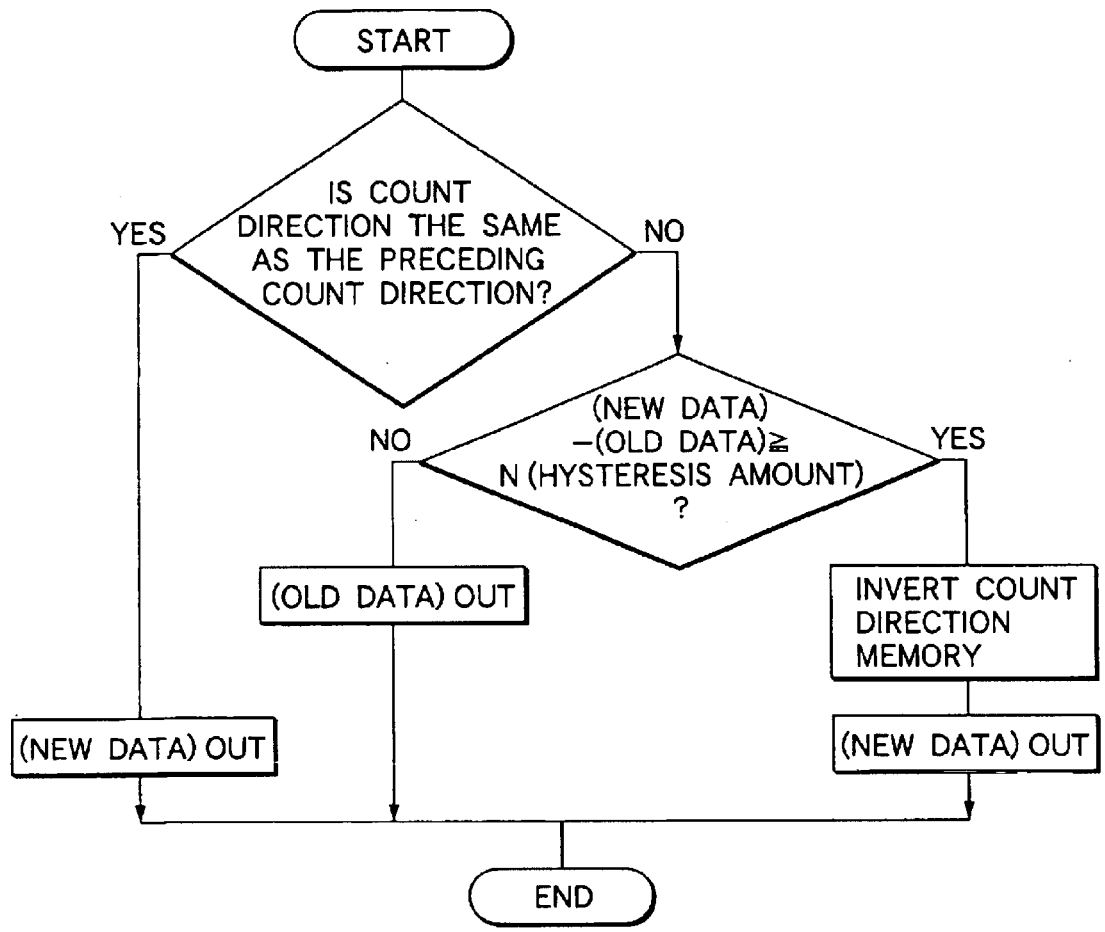
FIG. 5 is a flowchart to show a hysteresis processing procedure in a digital filter used in the third embodiment of the invention.

FIG. 5 shows a hysteresis processing procedure. Here, hysteresis amount N can be increased if stability takes precedence over speed; the hysteresis amount N can be reduced if speed takes precedence over stability.

Figure 6:
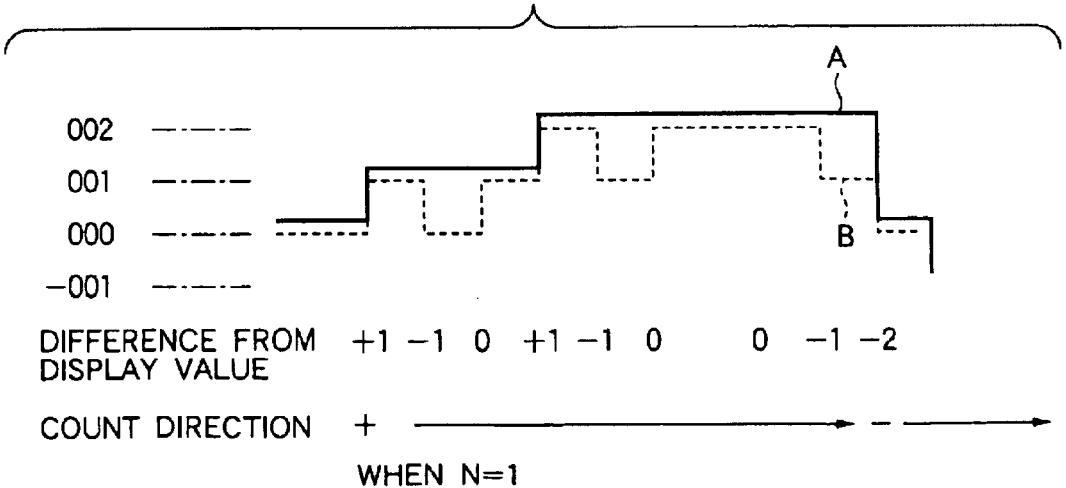
FIG. 6 is a drawing to show comparison between display value change state in the related art example and that in the third embodiment of the invention.

A display value change example when N=1 is indicated by solid line A in FIG. 6. It is clear that display flicker is reduced as compared with related art example indicated by dashed line B.

According to the above-mentioned embodiments of the invention, if controls are made unnecessary according to the invention, it is possible to reduce the effects of temperature change and secular change, eliminate the need for adjustment at the assembling time, facilitate calibration. Further, it is possible to miniaturize as the control attachment space is eliminated, so that it is possible to incorporate a large number of units inline for use for automatic control.

It the circuit for compensating for a phase shift in the output signal and the input signal from the probe is provided, it is also possible to easily deal with various types of probes, cable extension, etc.

If display is provided with hysteresis, the response speed can be improved, it is possible to suppress display flicker even with a filter having a small time constant, and it is also possible to use for automatic control requiring high-speed response.

Figure 7:
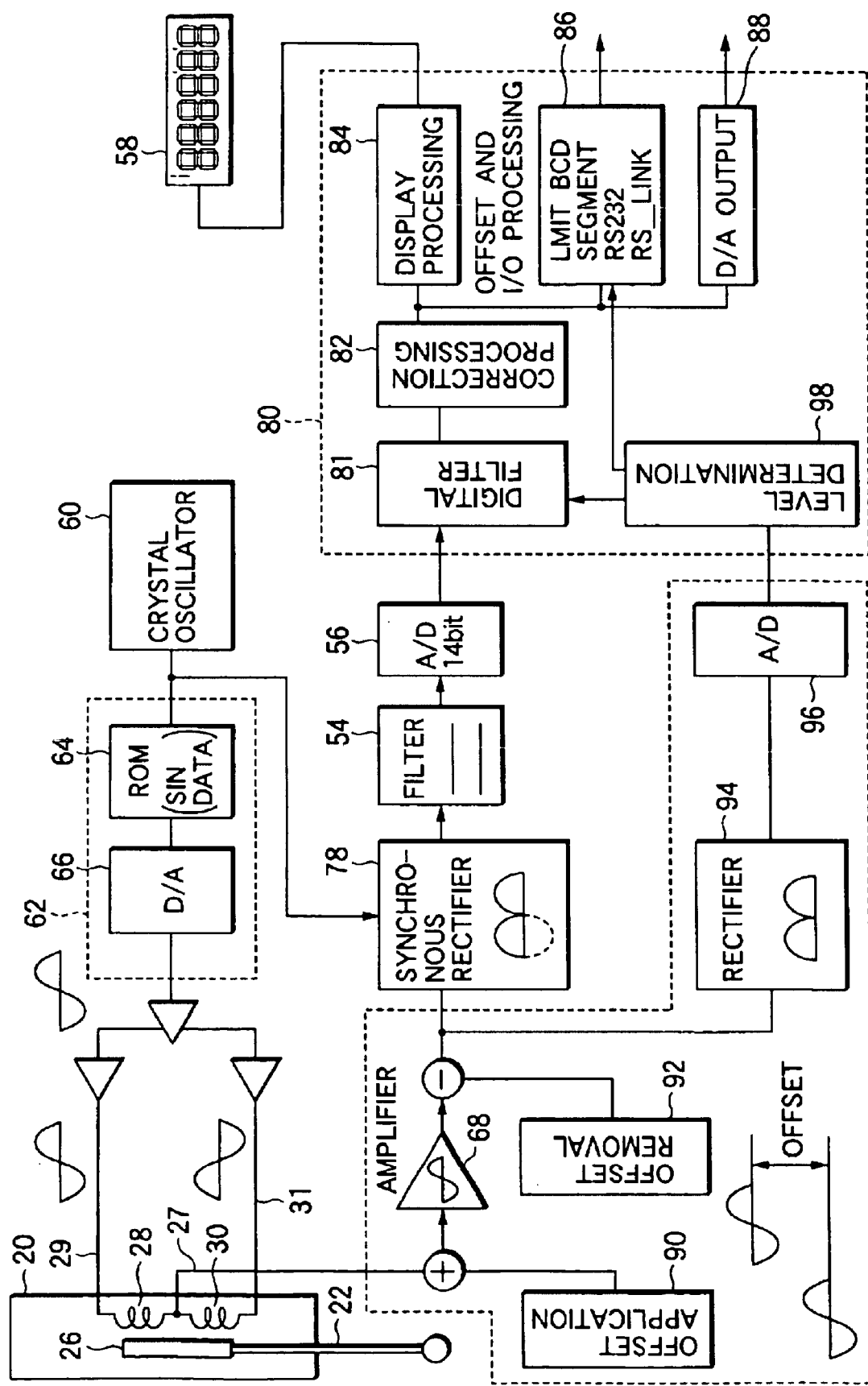
FIG. 7 is a circuit diagram to show the configuration of a fourth embodiment of an electric micrometer according to the invention.

Next, an electric micrometer with failure detection function of a differential transformer according to the invention will be discussed in detail. As shown in FIG. 7, an electric micrometer of a fourth embodiment according to the invention comprises a crystal oscillator 60, a drive signal generation CPU 62, an amplifier 68, a synchronous rectifier 78, a filter 54, a A/D converter 56, a signal processing CPU 80, an offset application circuit 90, an offset removal circuit 92, a rectification circuit 94, a A/D converter 96, and a level determination circuit 98. The offset application circuit 90 applies an offset signal for failure detection to a signal from the neutral point of the sensor coils 28 and 30, and has output impedance set higher than impedance of differential transformer. The offset removal circuit 92 restores the signal offset by the offset application circuit 90 to the former signal with no offset. The rectification circuit 94 rectifies the output signal of the offset removal circuit 92 so as to be able to also deal with a break in a drive signal line 29, 31. The A/D converter 96 converts output of the rectification circuit 94 to a digital signal. The level determination circuit 98 determines the level of an abnormal value based on output of the A/D converter 96 and is, for example, contained in the signal processing CPU 80. Other points are similar to those in the first, second and third embodiments and therefore will not be discussed again.

Figure 8A:
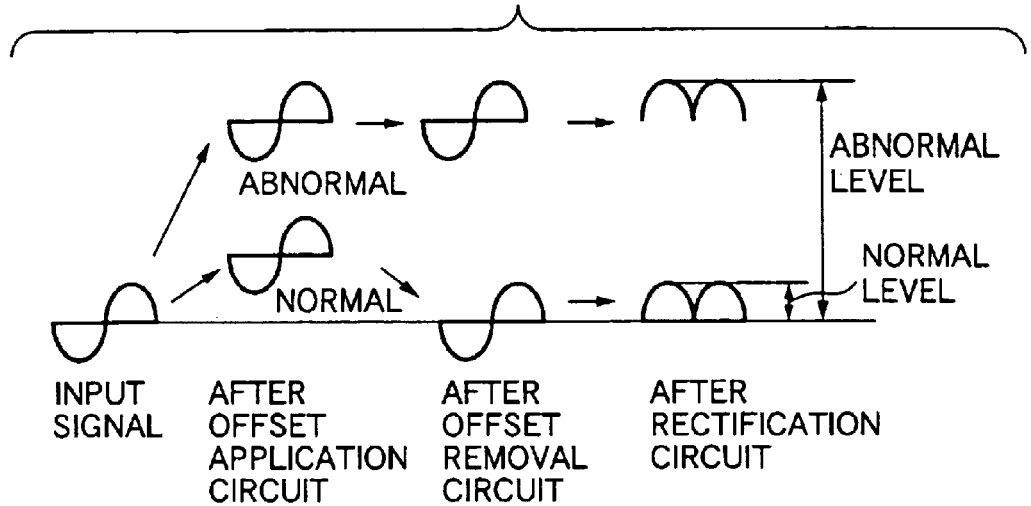
FIG. 8A is a drawing to show signal waveforms if an input signal line or both drive signal lines are broken in the fourth embodiment of the invention.

FIG. 8A shows an example of the relationship between an input signal and an output signal in a state in which an input signal line 27 or both the drive signal lines 29 and 31 are broken in the embodiment. As seen in the FIG. 8A, in the normal state, the offset applied by the offset application circuit 90 is removed by the offset removal circuit 92 and output of the rectification circuit 94 also becomes the normal level. In contrast, if the input signal line 27 or both the drive signal lines 29 and 31 are broken, the input signal is largely offset by the offset application circuit 90 because of the impedance relation and is not restored to the normal value through the offset removal circuit 92. Therefore, the level determination circuit 98 can determine that the level is abnormal.

Figure 8B:
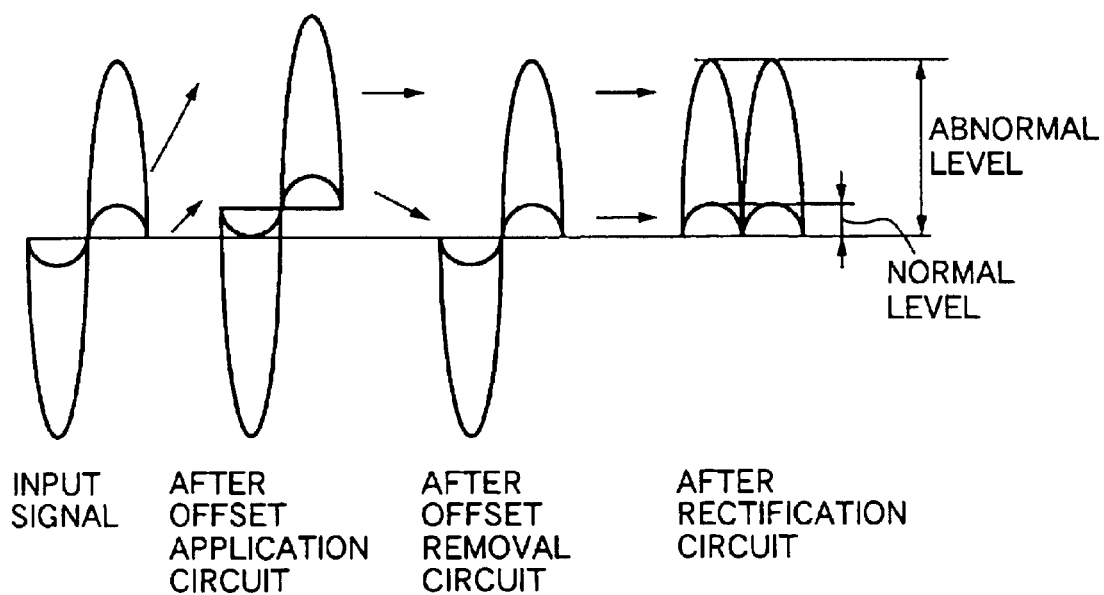
FIG. 8B is a drawing to show signal waveforms if one drive signal line is broken or short-circuited in the fourth embodiment of the invention.

FIG. 8B shows an example of the relationship between an input signal and an output signal in a state in which either of the drive signal lines 29 and 31 is broken or is short-circuited because water is entered therein. As shown in FIG. 8B, the amplitude remains large and output of the rectification circuit 94 becomes an abnormal level and therefore the level determination circuit 98 can detect the state.

When the level determination circuit 98 detects an anomaly, processing of the digital filter 81 is stopped, the subsequent input data is invalidated, the last measurement value is held. Further, and an alarm signal is output from the offset and input/output processing section 86 to external output of RS232, etc.

In the embodiment, the signal generation CPU 62 digitally generates a drive signal in place of the oscillator 32 using a coil and a capacitor as in the related art. Further, the correction processing section 82 digitally makes offset correction and gain correction in place of the controls 42 and 46 as in the related art. Therefore, the effects of temperature change and secular change are hard to receive, adjustment at the assembling time and calibration time can be omitted, and miniaturization is possible as the control attachment space is eliminated.

In the embodiment, a digital filter 96 is added and output of the A/D converter 56 is provided with hysteresis. Thus, if a filter with a large time constant is not used to lower the response speed, change in displacement display due to signal fluctuation in the proximity of the determination level becomes hard to occur. Further, the measurement value is approximately averaged, and stable display can be provided at high response speed suited for automatic control with the electric micrometer incorporated inline.

Figure 9:
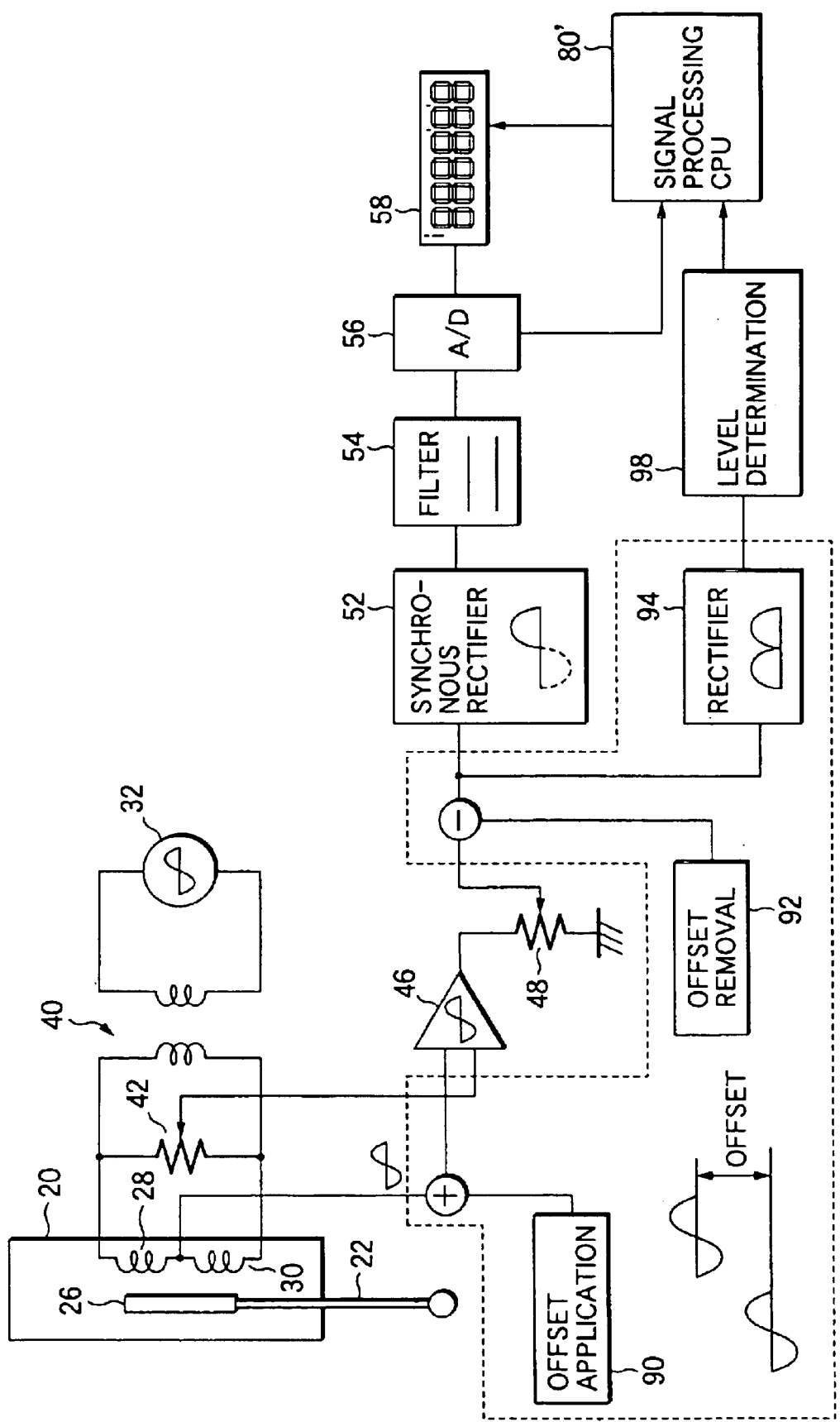
FIG. 9 is a circuit diagram to show the configuration of a fifth embodiment of an electric micrometer according to the invention.
Figure 14:
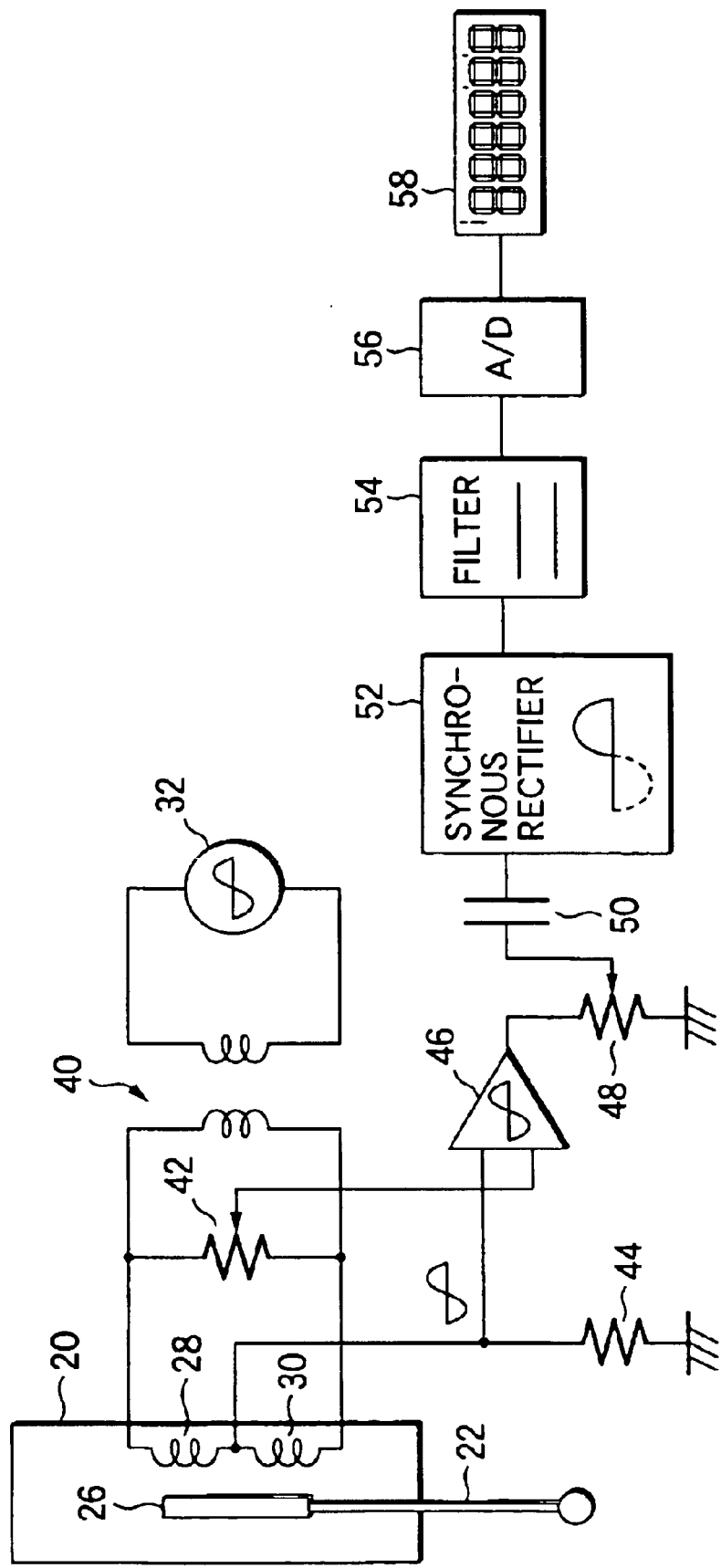
FIG. 14 is a circuit diagram to show a configuration example of an electric micrometer in the related art.
Figure 15:
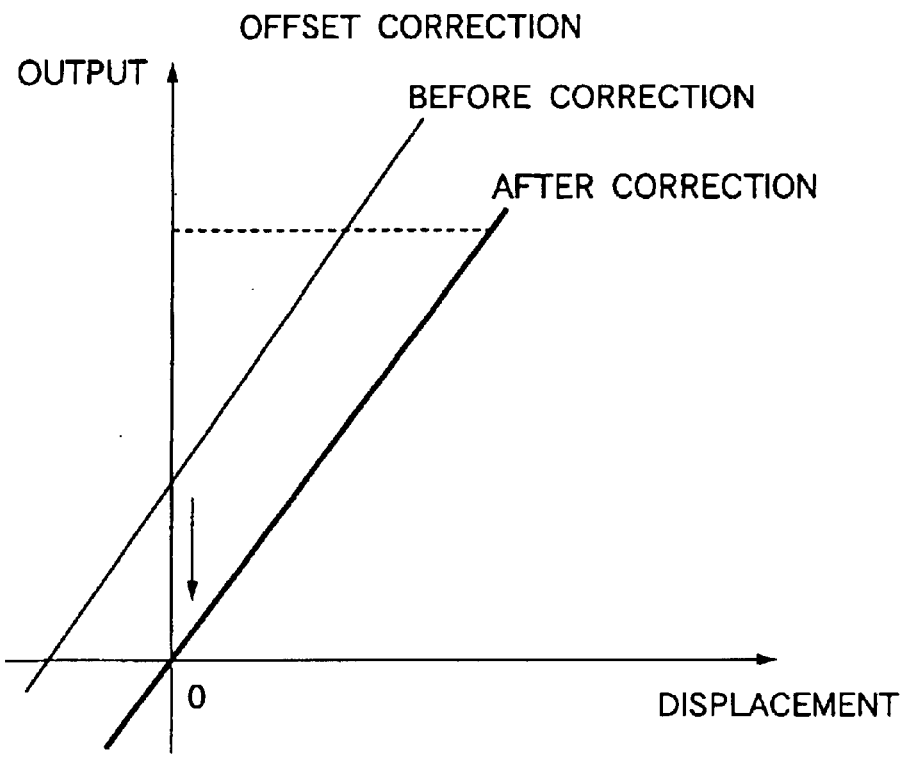
FIG. 15 is a drawing to shown offset correction in related art example.
Figure 16:
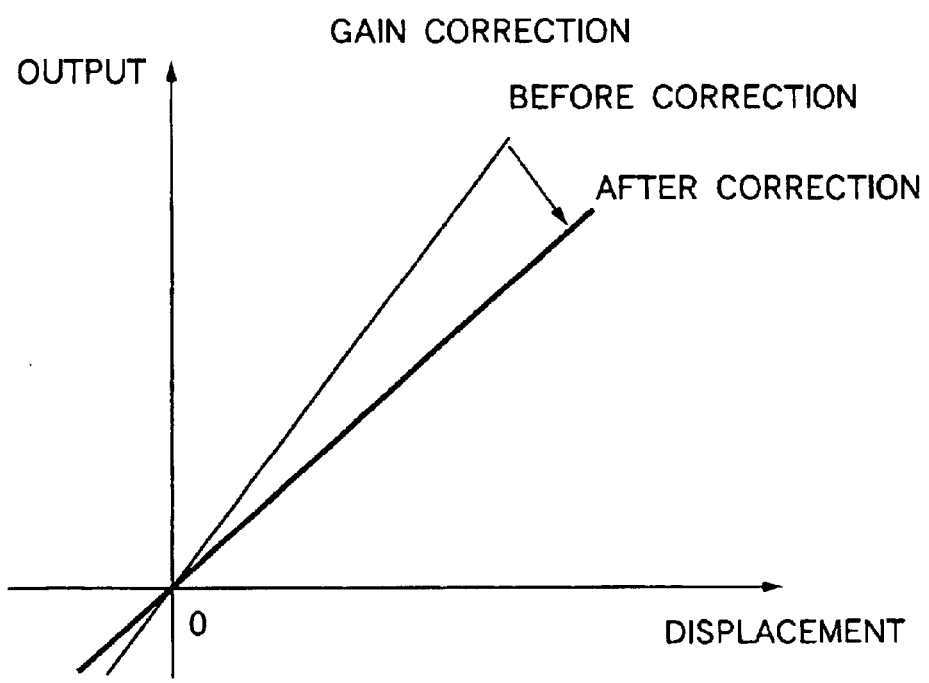
FIG. 16 is a drawing to shown gain correction in related art example.

The invention is not limited to the digital electric micrometers as described above and can also be applied to an analog electric micrometer as shown in FIG. 14. FIG. 9 shows a fifth embodiment of the invention applied to the analog electric micrometer.

In the second embodiment, an offset application circuit 90 is provided in place of the resistor 44 and an offset removal circuit 92 is placed on the output side of a gain correction control 48.

Other points are similar to those in the related art example previously described with reference to FIG. 14 and therefore will not be discussed again.

Also in the second embodiment, as in the fourth embodiment, if an input signal line 27 or both drive signal lines 29 and 31 are broken, a waveform as shown in FIG. 8A is produced. On the other hand, if one drive signal line 29 or 31 is broken or is short-circuited, the waveform becomes as shown in FIG. 8B. Therefore, it is possible for a level determination circuit 98 to discriminate between the normal state and the abnormal state.

When the level determination circuit 98 detects an anomaly, its signal is input to a signal processing CPU 80', an alarm is displayed on a display 58, the subsequent input from an A/D converter is invalidated, and the last data is held in the CPU 80'. The last data held in the CPU 80' can also be displayed on the display 58 as required. An alarm signal can also be output to the outside from the CPU 80'.

In the embodiment, the A/D converter 96 in the fourth embodiment is omitted and the level determination circuit 98 consisting of a comparator, etc., makes a direct level determination based on output of a rectification circuit 94, so that the configuration is simple.

According to the electric micrometer with failure detection function of the invention described above, it is possible to discriminate between the break or short-circuit state of each signal line and the normal state and it is possible to detect a failure easily and precisely.

Therefore, to conduct automatic measurement inline, etc., when a break in the cable between the probe and the electric unit or a connector connection failure is detected, a warning message is generated and it is possible to prevent malfunction caused by erroneous data.

Figure 10:
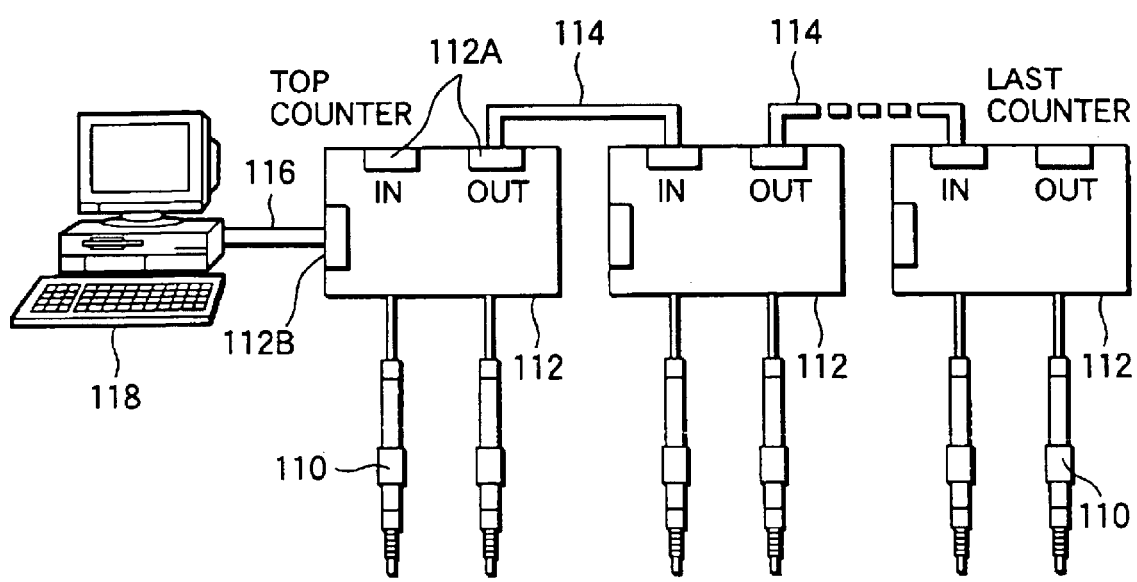
FIG. 10 is a diagram to show a configuration example of a multipoint measurement system using differential transformers according to the invention.
Figure 11:
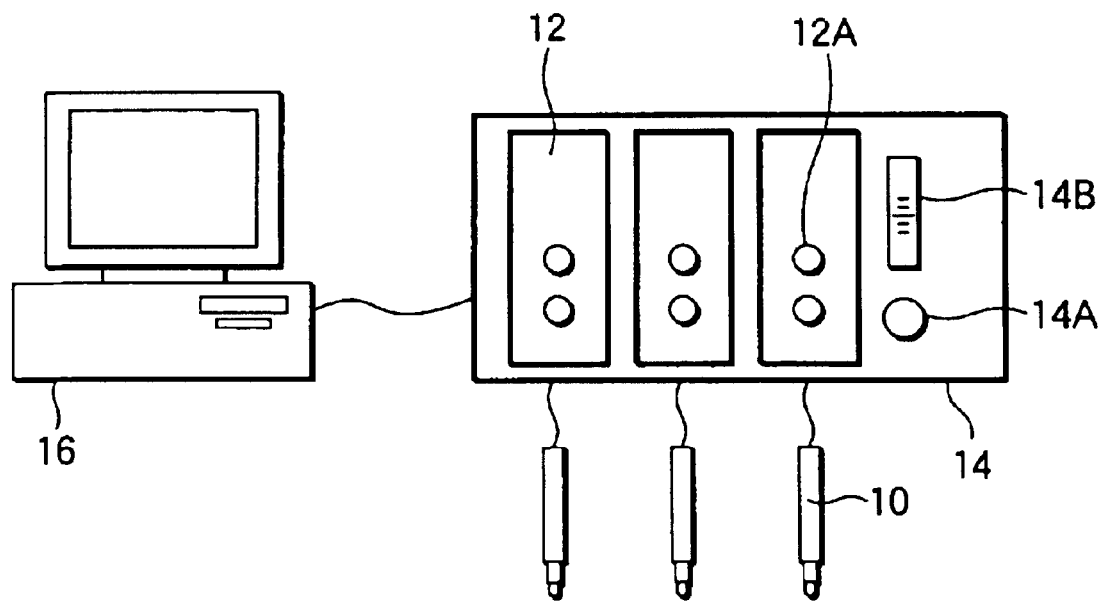
FIG. 11 is a diagram to show an example of multipoint measurement in a related art conducted using a linear encoder.
Figure 12:
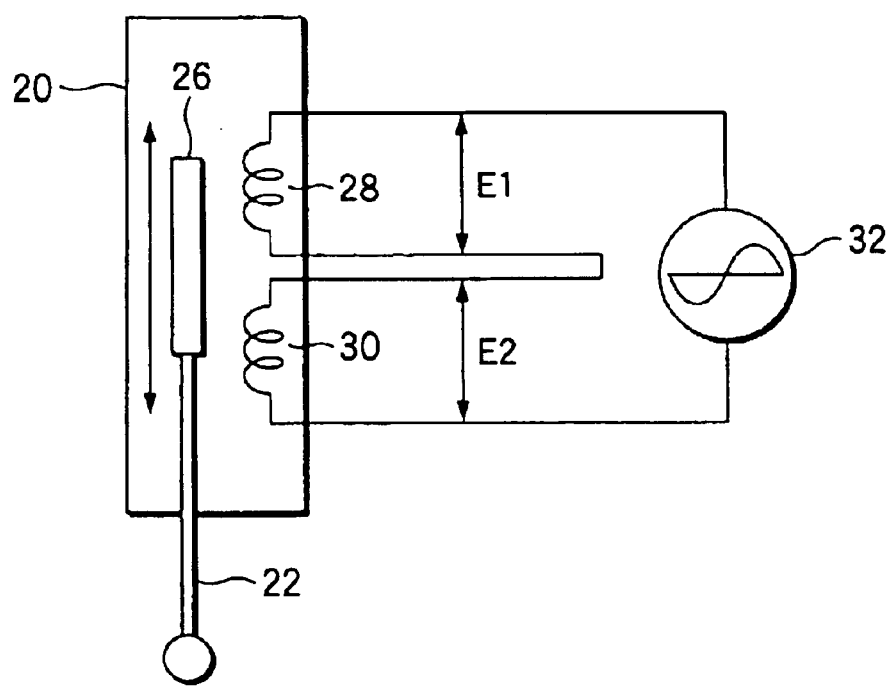
FIG. 12 is a diagram to show the principle of the differential transformer used with the electric micrometer.
Figure 13:
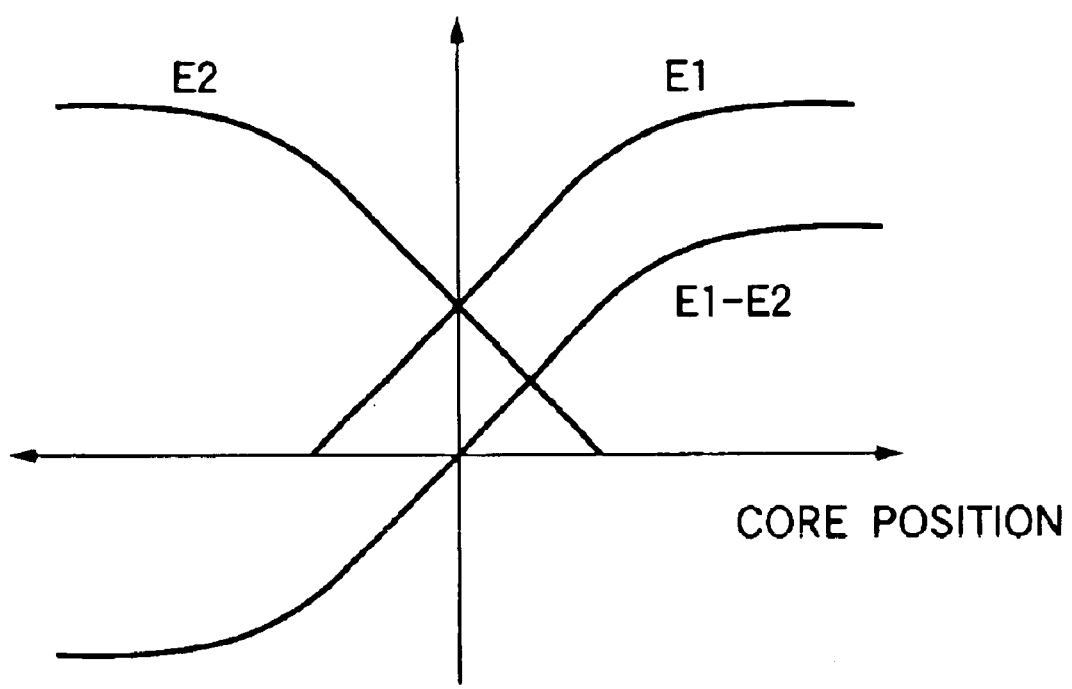
FIG. 13 is a drawing to show an example of sensor coil output of the differential transformer.

FIG. 10 shows an example of a multipoint measurement system using the differential transformers according to the above-mentioned first to fourth embodiments.

In FIG. 10, numeral 110 denotes an electric micrometer using the differential transformer according to the embodiment. Numeral 112 denotes a counter for counting output of the electric micrometer. Numeral 114 denotes a link cable for connecting the counters using a link connector 112A. Numeral 116 denotes a communication cable of RS-232C, etc., for connecting, for example, the top counter and a personal computer (PC) 118 using a communication connector 112B of RS-232C, etc.

Three calibration data pieces of the differential transformers each consisting of the original offset value, the span value and the reference value, for example, can be previously detected and stored in the personal computer 118.

To conduct measurement, as start preprocessing, the calibration data of each differential transformer is called from the personal computer 118 and is transmitted to each counter 112.

When measurement is started, each counter 112 performs calculation according to expression (1), provides the measurement value, and outputs the data to the personal computer 118. The counter value can be output to the personal computer 118 intact, the calibration data of each differential transformer can be called in the personal computer 118, calculation according to expression (1) can be performed, and the measurement value can be provided by executing remote calibration. In this case, the configuration of each counter 112 can be simplified.

Further, a zero measurement command, a span measurement command, and a reference value measurement command are provided as dedicated commands to calibration and are executed in the personal computer 118 and then measurement responsive to each command can be conducted for each differential transformer and the measurement values can be read into the personal computer 118 for storage.

In the embodiments described above, the invention is applied to the electric micrometers, but it is obvious that the invention is not limited to the electric micrometers and can also be applied to other electric microproducts and general measuring instruments using the differential transformers in a similar manner.

What is claimed is:

1. An apparatus for signal processing of a differential transformer for obtaining a measurement signal from the differential transformer, comprising:

a drive signal generation section for generating a sinusoidal drive signal to be applied to the differential transformer; and a signal processing section for obtaining the measurement signal from an output signal from the differential transformer, wherein at least a part of the drive signal generation section and the signal processing section is digitalized.

2. The signal processing apparatus as claimed in claim 1, wherein the drive signal generation section generates the sinusoidal drive signal from digital form.

3. The signal processing apparatus as claimed in claim 2, wherein the drive signal generation section includes an oscillator for generating a clock signal, and a memory for storing a waveform data called in synchronization with the clock signal of the oscillator.

4. The signal processing apparatus as claimed in claim 1, wherein the signal processing section includes an output correction portion for making an offset correction and a gain correction to the output signal of the differential transformer in digital form.

5. The signal processing apparatus as claimed in claim 1, wherein the signal processing section includes a phase adjustment portion for digitally compensating for a phase shift in the output signal of the differential transformer.

6. The signal processing apparatus as claimed in claim 1, wherein the signal processing section includes a digital filter for providing hysteresis to the output signal of the differential transformer.

7. The signal processing apparatus as claimed in claim 1, further comprising:

a data communication portion for communicating with an electric unit.

8. The signal processing apparatus as claimed in claim 7, wherein the data communication portion receives an offset correction or a gain correction in response to the output signal of the differential transformer from the exterior.

9. A method for signal processing of a differential transformer for obtaining a measurement signal from the differential transformer, comprising:

digitalizing at least a part of proceedings from a generation of a sinusoidal drive signal to be applied to the differential transformer to an output of the measurement signal.

10. The signal processing method as claimed in claim 9, wherein the digitalizing step includes generating the sinusoidal drive signal from digital form.

11. The signal processing method as claimed in claim 9, wherein the digitalizing step includes making an offset correction and a gain correction to an output signal of the differential transformer in digital form.

12. The signal processing method as claimed in claim 9, wherein the digitalizing step includes digitally compensating for a phase shift in an output signal of the differential transformer.

13. The signal processing method as claimed in claim 9, wherein the digitalizing step includes providing hysteresis to an output signal of the differential transformer.

* * * * *